US012569926B2

(12) United States Patent
Hoeger

(10) Patent No.: US 12,569,926 B2
(45) Date of Patent: Mar. 10, 2026

(54) INTEGRATED WELDING TORCHES AND EXTENSION CABLES

(71) Applicant: Illinois Tool Works Inc., Glenview, IL (US)

(72) Inventor: Michael Vincent Hoeger, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 782 days.

(21) Appl. No.: 17/943,649

(22) Filed: Sep. 13, 2022

(65) Prior Publication Data

US 2023/0083988 A1     Mar. 16, 2023

Related U.S. Application Data

(60) Provisional application No. 63/243,469, filed on Sep. 13, 2021.

(51) Int. Cl.
B23K 9/29        (2006.01)
B23K 9/167       (2006.01)

(52) U.S. Cl.
CPC .............. B23K 9/296 (2013.01); B23K 9/167 (2013.01)

(58) Field of Classification Search
CPC ......... B23K 9/296; B23K 9/167; B23K 9/287
See application file for complete search history.

(56) References Cited

U.S. PATENT DOCUMENTS

| | | | |
|---|---|---|---|
| 2,310,164 A | 2/1943 | Prendergast | |
| 2,692,324 A | 10/1954 | Strackbein | |
| 2,797,301 A | * 6/1957 | Copleston | B23K 9/296 |
| | | | 285/239 |
| 4,049,943 A | 9/1977 | Pratt | |
| 5,571,427 A | 11/1996 | Dimock et al. | |
| 9,242,307 B2 | 1/2016 | Barker et al. | |
| 10,493,554 B2 | 12/2019 | Daniels | |
| 10,919,102 B2 | 2/2021 | Reichel et al. | |
| 2016/0129516 A1* | 5/2016 | Hoeger | B23K 9/1087 |
| | | | 219/121.11 |

(Continued)

FOREIGN PATENT DOCUMENTS

DE        102018007649        5/2019

OTHER PUBLICATIONS

Int'l Search Report and Written Opinion Appln No. PCT/US2022/043333 mailed Feb. 14, 2023.

*Primary Examiner* — Robert G Bachner
(74) *Attorney, Agent, or Firm* — McAndrews, Held & Malloy, Ltd.

(57)        ABSTRACT

An example welding torch includes: a handle piece that is electrically and mechanically connected to the torch head on a first end of the handle piece; a power supply connector configured to be coupled to a welding power supply on a first end of the power supply connector, wherein at least one of the handle piece or the power supply connector are a single piece; a welding cable that is electrically and mechanically connected to both a second end of the handle and a second end of the power supply connector; a first cover over the torch head, the handle piece, and a first portion of the welding cable connected to the handle piece; and a second cover over the power supply connector and a second portion of the welding cable connected to the power supply connector.

22 Claims, 11 Drawing Sheets

(56)  References Cited

U.S. PATENT DOCUMENTS

2019/0210140 A1      7/2019  Parker
2020/0395711 A1*    12/2020  Klein .................... H01R 24/005
2021/0069816 A1      3/2021  Sivula

* cited by examiner

206

108

204

202

1100

1102

1104

1106

INTEGRATED WELDING TORCHES AND EXTENSION CABLES

BACKGROUND

This disclosure relates generally to welding torches and, more particularly, to integrated welding torches and extension cables.

Conventional gas tungsten arc welding (GTAW) torches are sold as torch packages, which include three main functional elements: the torch head, the power cable, and the welding power source connector. The design of each element in conventional GTAW torches is meant to enable the element to be individually serviceable and modular. For example, any of the torch head, power cable, and welding power source connector of conventional GTAW torches can be replaced if damaged. While the modular approach provides advantages, the approach also adds significant complexity to both the manufacturing and customer experience aspects. For example, having multiple options for the same function torch component may require the customer to select, or seek advice regarding, the best component for the customer's application, with the risk of selecting sub-optimal components.

SUMMARY

Integrated welding torches and extension cables are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
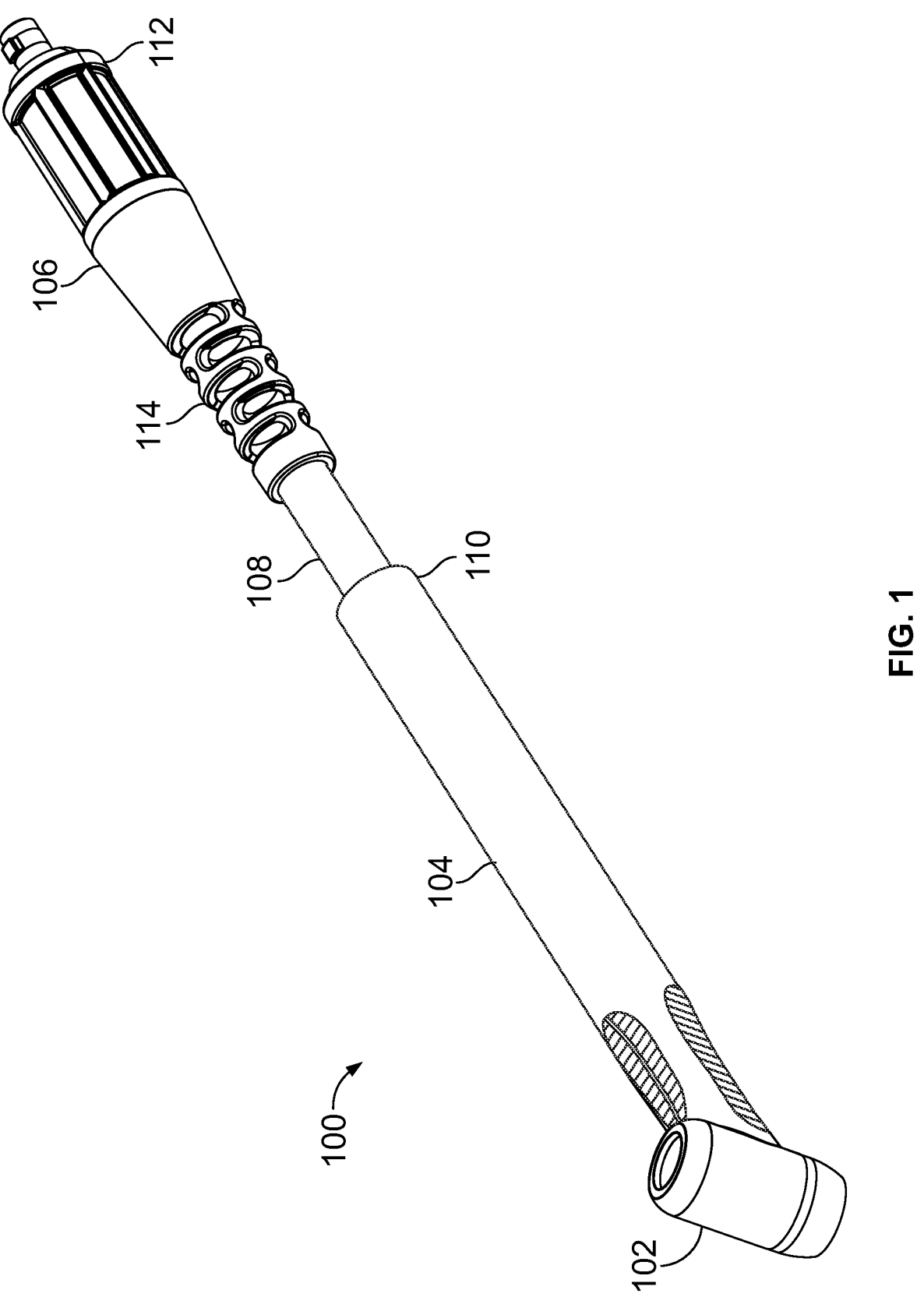
FIG. 1 illustrates an example integrated gas tungsten arc welding (GTAW) torch, in accordance with aspects of this disclosure.

For the purpose of promoting an understanding of the principles of this disclosure, reference will be now made to the examples illustrated in the drawings and specific language will be used to describe the same. It will nevertheless be understood that no limitation of the scope of the claims is intended by this disclosure. Modifications in the illustrated examples and such further applications of the principles of this disclosure as illustrated therein are contemplated as would typically occur to one skilled in the art to which this disclosure relates.

As discussed above, conventional modular welding torches can create significant complexity, both from the customer experience and a manufacturing perspective. Disclosed example welding torches and extension cables have integrated components, resulting in fewer individual pieces per assembly and improved manufacturability. Additionally, disclosed example integrated welding torches and extension cables enable customers to select from integrated torch packages based on descriptions of the torch capabilities.

Additional manufacturing steps tend to add cost to a welding torch, and additional components may add cost and/or potential for supply chain problems. Certain manufacturing processes, such as brazing, bright dipping, and/or annealing, may add outsize costs to the finished welding torch. Disclosed example welding torches and extension cables also substantially reduce manufacturing complexity and costs, compared with conventional modular welding torches, by eliminating manufacturing steps and/or higher-cost manufacturing steps from the manufacturing process. Disclosed example welding torches and extension cables eliminate unnecessary or redundant parts, eliminate and/or consolidate production operations. In disclosed example welding torches and extension cables, the torch head, handle, and power source connectors are all integrated into single pieces for assembly into the torch package with the connecting weld cable. A single piece may refer to an integral piece, and/or multiple pieces which are non-serviceably attached, such that separation or removal of non-serviceable pieces would result in destruction of the separated pieces.

In some disclosed examples, the torch head and handle is overmolded with a portion of the welding cable and the power source connector are also over molded onto the power cable. The strain relief on either side of the welding cable may also be overmolded.

Disclosed example welding torches and extension cables may enable testing and marking to International Electrotechnical Commission (IEC) Standard Number 60974-7: 2019 and/or to IEC Standard Number 60529:1989+AMD1: 1999+AMD2:2013 more easily, reliably, simply, and/or less expensively than conventional welding torches and extension cables. Example welding torches and extension cables disclosed here may provide improved impact resilience, improved cable flex life, improved arc starting creepage and clearance paths, and a reduced size for a given insulation strength. Disclosed example welding torches and extension cables do not require further barriers to prevent ingress of foreign objects to access weld current.

As used herein, the word "exemplary" means "serving as an example, instance, or illustration." The examples described herein are not limiting, but rather are exemplary only. It should be understood that the described examples are not necessarily to be construed as preferred or advantageous over other examples. Moreover, the terms "examples of the invention," "examples," or "invention" do not require that all examples of the invention include the discussed feature, advantage, or mode of operation.

Disclosed example welding torches include: a handle piece that is electrically and mechanically connected to the torch head on a first end of the handle piece; a power supply connector configured to be coupled to a welding power supply on a first end of the power supply connector, wherein at least one of the handle piece or the power supply connector are a single piece; a welding cable that is electrically and mechanically connected to both a second end of the handle and a second end of the power supply connector; a first cover over the handle piece and a first portion of the welding cable connected to the handle piece; and a second cover over the power supply connector and a second portion of the welding cable connected to the power supply connector.

In some example welding torches, the torch head, the handle piece, and the power supply connector are each a single piece. In some example welding torches, the torch head and the handle piece are combined as a single piece. In some example welding torches, at least one of the first cover or the second cover comprises an overmolding. In some example welding torches, at least one of the first cover or the second cover comprises a clamshell cover.

Some example welding torches further include a torch head configured to support an electrode. In some example welding torches, the first cover is further over the torch head. Some example welding torches further include: a back cap attached to the torch head; a nozzle attached to the torch head; and a collet attached to the torch head and configured to hold a tungsten electrode in electrical continuity with the torch head.

In some example welding torches, the handle piece has exterior threads on the first end of the handle and the torch head includes interior threads configured to receive the exterior threads. In some example welding torches, the interior threads of the torch head and the exterior threads of the handle are interfering threads.

In some example welding torches, the gas tungsten arc welding torch does not include brazing. Some example welding torches, further include an input device attached to the handle piece. Some example welding torches further include input circuitry coupled to the input device and attached to the handle piece, in which the input circuitry is positioned on an exterior of the handle piece and under the first cover.

Some example welding torches further include a control device configured to be detachably coupled to the first cover. In some example welding torches, the control device is a wireless control device configured to communicate an input to a welding power supply via wireless communications. In some example welding torches, the control device includes a housing configured to fit within a pocket in the first cover. In some example welding torches, at least one of the pocket or the housing includes a retention feature to retain the housing within the pocket. In some example welding torches, the pocket is formed as part of an overmolding process.

In some example welding torches, the welding cable is configured to be crimped to the second end of the handle piece such that a conductor of the welding cable is secured in electrical contact with the handle piece. In some example welding torches, the welding cable is configured to be crimped to the second end of the power supply connector such that a conductor of the welding cable is secured in electrical contact with the power supply connector. In some example welding torches, the second cover includes a molded strain relief configured to absorb stress between a jacket of the welding cable and the power supply connector.

Disclosed example welding torch extension cables include: a female power supply connector configured to receive a welding cable connector on a first end of the female power supply connector; a male power supply connector configured to be coupled to a welding power supply on a first end of the male power supply connector; a welding cable that is electrically and mechanically connected to both a second end of the female power supply connector and a second end of the male power supply connector; a first cover over the female power supply connector and a first portion of the welding cable connected to the female power supply connector, wherein the first and second ends of the female power supply connector are a single piece; and a second cover over the male power supply connector and a second portion of the welding cable connected to the male power supply connector, wherein the first and second ends of the male power supply connector are a single piece.

FIG. 1 illustrates an example integrated gas tungsten arc welding (GTAW) torch 100. The example GTAW torch 100 of FIG. 1 is configured to be connected to a GTAW power supply for delivery of welding power and to a gas source for delivery of shielding gas to perform GTAW operations. The example torch 100 includes a torch head 102, a handle 104, a power supply connector 106, and a welding cable that conducts welding power and shielding gas from the power supply connector 106 to the handle 104 for delivery to the torch head 102. Each end of the example torch 100 includes a cover or overmolding, which covers at least a portion of the welding cable 108 attached to that end of the welding torch 100. Example materials that may be used for the cover or overmolding include thermoplastic (e.g., high temperature grades such as PPS or LCP), elastomers (like silicone or FKM, or thermosetting polymers (like phenolic or epoxy).

Figure 2:
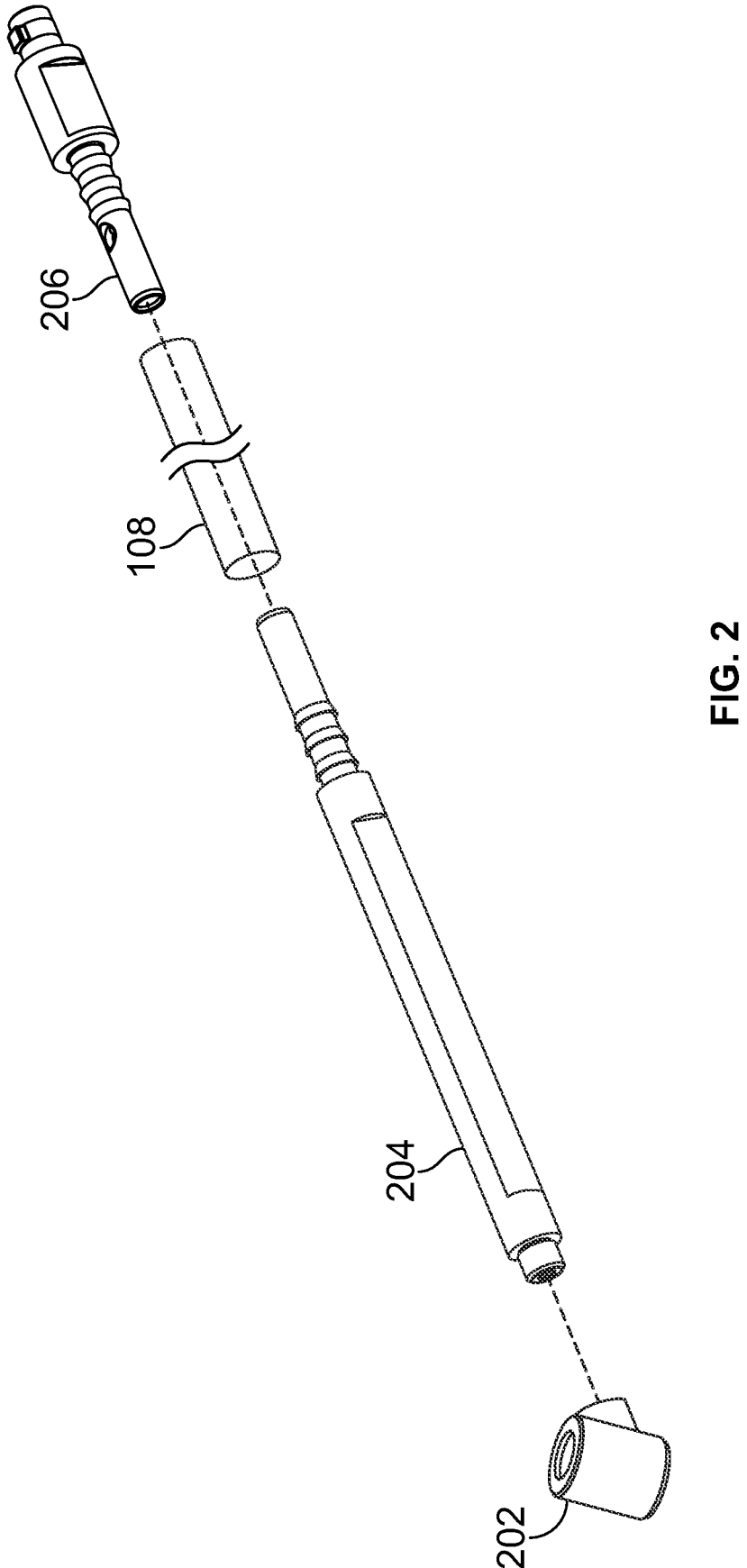
FIG. 2 is a perspective view of example components of the integrated GTAW torch of FIG. 1, including torch head, handle, and power supply connector components.

FIG. 2 is a perspective view of example components of the integrated GTAW torch 100 of FIG. 1, including a torch head piece 202, a handle piece 204, and a power supply connector piece 206. The example components 202, 204, 206 of FIG. 2 are illustrated without the cover or overmolding of FIG. 1. As illustrated in FIG. 2, each of the torch head 202, the handle piece 204, and the power supply connector 206 are a single piece of material. Compared to conventional welding torches, the single-piece torch head 202, handle piece 204, and power supply connector 206 involve reduced numbers of steps and fewer or zero complex manufacturing steps such as brazing or bright dipping. In some examples, annealing of the pieces is also automated, reduced, or eliminated. In the illustrated examples, assembly steps are limited to threading, torqueing, fitting, and crimping. In some examples, one or more of the conductive components 202-206 may be annealed to improve workability for crimping or clamping steps.

Figure 3:
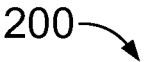
FIG. 3 is a perspective view of the example torch head of FIG. 2.
Figure 3:
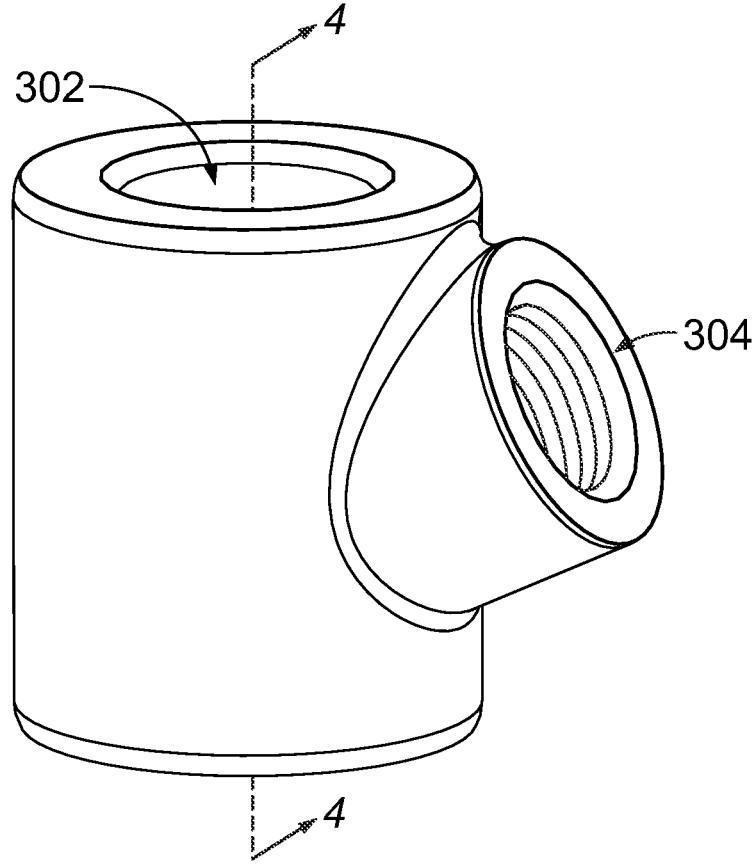
Figure 4:
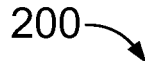
FIG. 4 is a cross-section view of the example torch head of FIG. 2.
Figure 4:
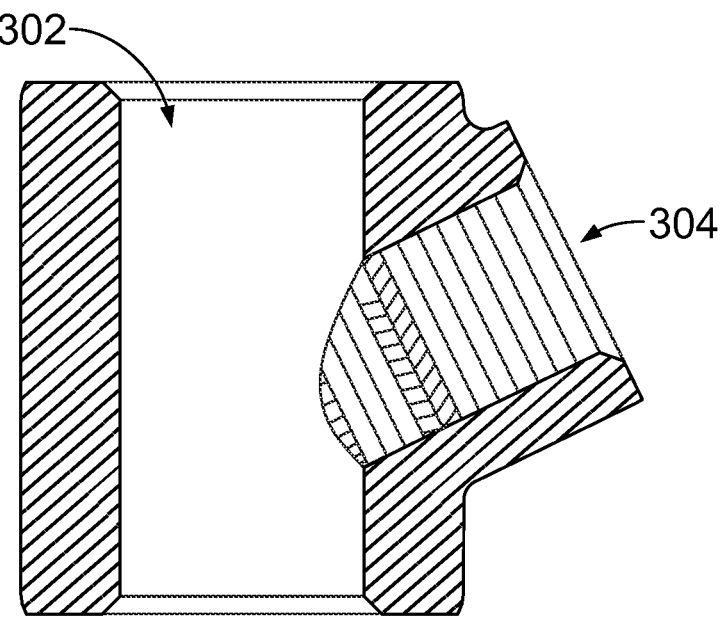

FIG. 3 is a perspective view of the example torch head 202 of FIG. 2. FIG. 4 is a cross-section view of the example torch head 202 of FIG. 2. The torch head 202 supports a collet, a collet body, a tungsten electrode, a back cap, and a nozzle, and is configured to deliver electrical power to the tungsten electrode via the collet. To this end, the example torch head 202 is constructed of brass, copper, or another conductor. The example torch head 202 may be forged, or cast and then machined to produce a first bore 302 and a second bore 304 through the torch head 202.

The second bore 304 is tapped to produced interior threads. The interior threads connect the torch head 202 to the handle 204, which has corresponding exterior threads on one end of the handle 204. In some other examples, the handle 204 is constructed to have the interior threads and the torch head 202 is constructed to have the exterior threads.

In some examples, during construction of the torch 100 the torch head 202 and the handle 204 are overtorqued to create plastic deformation between the threads of the torch head 202 and the handle 204, which may prevent detachment of the torch head 202 and the handle 204 or leaking of gas between the connection. By screwing the torch head 202 and the handle 204 together, the torch head 202 and the handle 204 are electrically, fluidly, and mechanically connected. In some examples, the interior and/or exterior threads are configured as interfering threads, which is a type of threading that creates an interference between the connected threads, plastically deforming the threads on one or both sides of the thread. An example is by an undersized root diameter on the female connection or interior thread. In some other examples, thread locking compound or glue may be applied to the threads. In still other examples, as described below with reference to FIG. 9, the torch head 202 and the handle 204 may be constructed as a single forged or machined piece.

Figure 5:
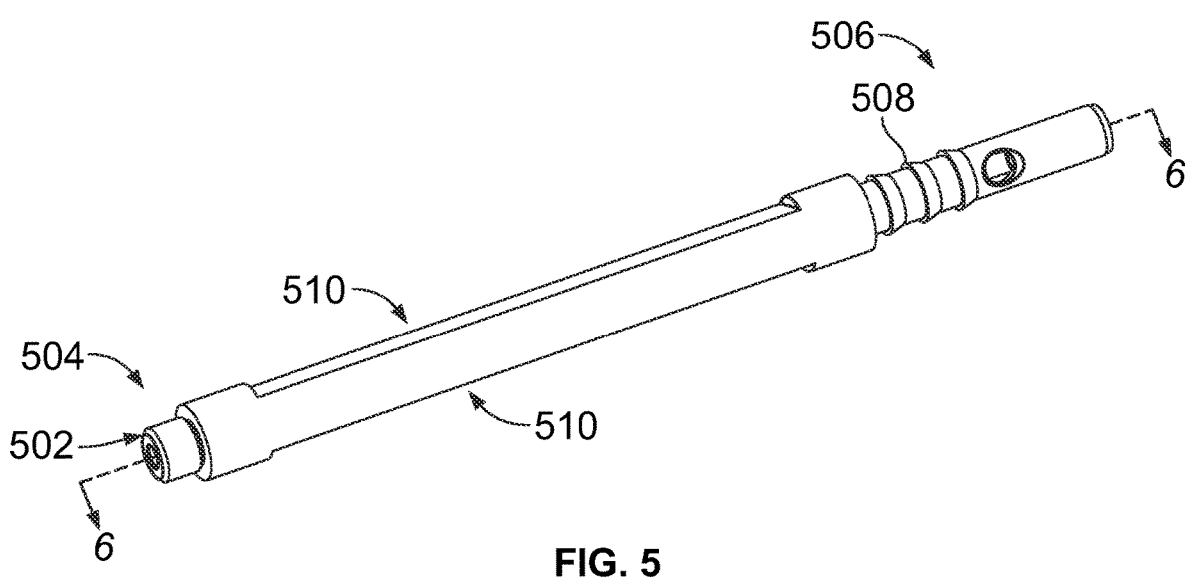
FIG. 5 is a perspective view of the example handle of FIG. 2.
Figure 6:
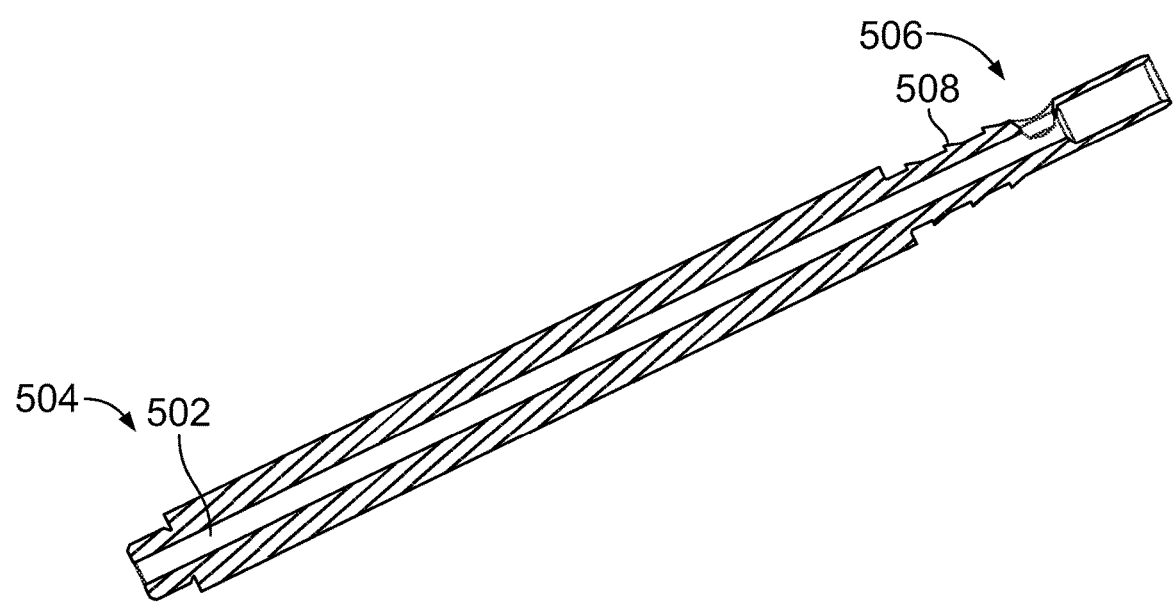
FIG. 6 is a cross-section view of the example handle of FIG. 2.

FIG. 5 is a perspective view of the example handle 204 of FIG. 2. FIG. 6 is a cross-section view of the example handle 204 of FIG. 2. As illustrated in FIGS. 5 and 6, the handle 204 includes a bore 502 which extends the length of the handle 204. The handle 204 may be constructed of brass, copper, or other conductor to conduct electrical current to the torch head 202 for welding.

As mentioned above, the handle 204 is electrically, fluidly, and mechanically connected to the torch head 202 on a first end 504 of the handle 204. A second end 506 of the handle 206 connects to the welding cable 108, which conducts shielding gas and electrical current to the handle 204. In the example welding torch 100, the cable 108 includes a conductor cable within an outer hose. The second end 506 of the handle 204 includes retention features, such as barbs 508, to retain the conductor cable and the hose onto the handle 204 (e.g., via a ferrule, a clamp such as an Oetiker clamp, or other retention device). While the retention features of the illustrated example are barbs, other retention features may be used, such as knurling, hose clamps, stippling, flaring, and/or any other retention feature.

The welding cable 108 is attached to the second end 506 of the example handle 204 by fitting a ferrule over the hose, lugging the handle 204 to the conductor cable, pressing the handle 204 into the hose, and crimping a ferrule onto the hose to retain the handle 204 onto the hose via the retention features (e.g., the barbs 508 of FIG. 5). Once attached, the shielding gas may flow into the handle 204 from the welding cable.

The example handle 204 includes anti-rotation feature 510 in the body of the handle 204. The anti-rotation feature 510 may be one or more flats, grooves, and/or other features, and may reduce or prevent rotation of the handle 204 under a cover or overmolding, which improves grip and control of the torch 100 by the user.

Figure 7:
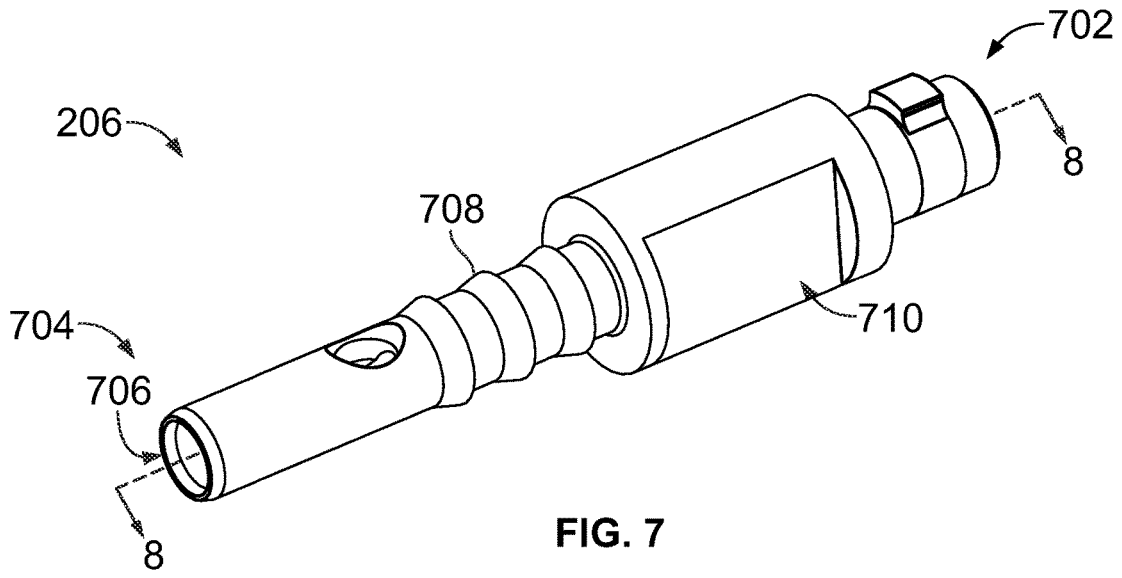
FIG. 7 is a perspective view of the example power supply connector of FIG. 2.
Figure 8:
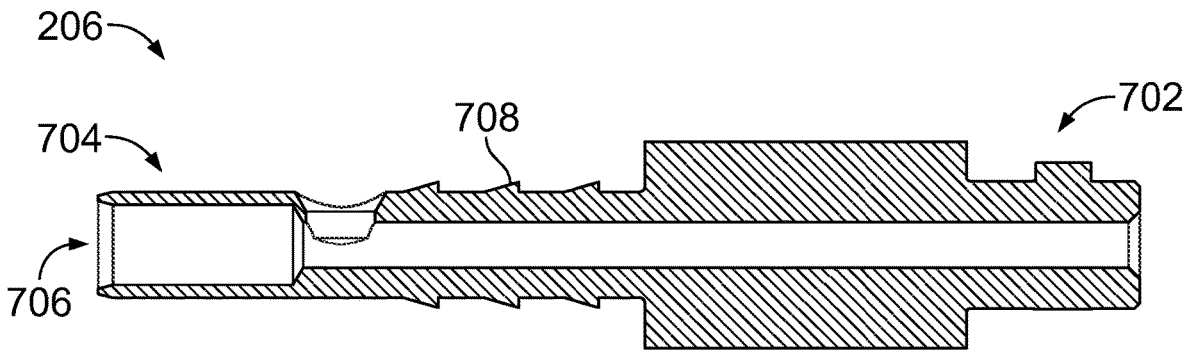
FIG. 8 is a cross-section view of the example power supply connector of FIG. 2.

FIG. 7 is a perspective view of the example power supply connector 206 of FIG. 2. FIG. 8 is a cross-section view of the example power supply connector 206 of FIG. 2. The power supply connector 206 connects the cable 108 to a welding power supply to receive welding current and/or shielding gas for delivery to the torch head 202.

A first end 702 of the power supply connector 206 is configured to be connected to a welding power supply to conduct welding power and shielding gas from the welding power supply to the welding cable 108. The power supply connector 206 includes a bore 704 for conduction of the shielding gas from the power supply to the welding cable 108.

A second end 706 of the power supply connector 206 is connected to the welding cable in a similar or identical manner as the second end 506 of the handle 204. For example, the second end 706 may include retention features such as barbs 708. The second end 706 of the illustrated example power supply connector 206 is connected to the welding cable 108 by fitting a ferrule over the hose, lugging the power supply connector 206 to the conductor cable, pressing the power supply connector 206 into the hose, and crimping a ferrule onto the hose to retain the power supply connector 206 onto the hose via the retention features (e.g., the barbs 708 of FIG. 7). Once attached, the shielding gas may flow into the welding cable from the power supply connector 206.

The example power supply connector 206 includes antirotation grooves 710 in the body of the power supply connector 206. The anti-rotation feature 710 may be one or more flats, grooves, and/or other features, and may reduce or prevent rotation of the power supply connector 206 under a cover or overmolding, which improves grip and control of the torch 100 by the user when connecting the cable to the welding power supply.

Returning to FIG. 1, after constructing and assembling the components 202-206 with the welding cable 108, the torch head 202 and handle 204 are covered with a first cover 110, such as an overmold, clamshell, or other type of cover that provides electrical insulation, gas sealing, and/or improved grip and/or comfort to the torch head 202 and handle 204. As illustrated in FIG. 1, the first cover 110 covers the torch head 202, the handle 204, and at least a first portion of the welding cable 108. In some examples, the first cover 110 includes a strain relief between the handle piece 104 and the welding cable 108. The strain relief may be a molded strain relief configured to absorb stress between a jacket of the welding cable 108 and the handle 204.

Similarly, the power supply connector 206 and the welding cable 108 are covered with a second cover 112, such as an overmold, clamshell, or other type of cover that provides electrical insulation, gas sealing, and/or improved grip and/or comfort to the power supply connector 206. As illustrated in FIG. 1, the second cover 112 covers the power supply connector 206 and at least a second portion of the welding cable 108 attached to the power supply connector 206. As illustrated in FIG. 1, the second cover 112 includes an accordion-style strain relief 114 between the power supply connector 106 and the welding cable 108. The accordion-style strain relief 114 may be a molded strain relief configured to absorb stress between a jacket of the welding cable 108 and the power supply connector 206.

In some examples, the first cover 110 and the second cover 112 may be overmolded at the same time during manufacturing, such as by placing the torch head 202 and handle 204 into a first mold (or first section of a mold) and placing the power supply connector 206 into a second mold (or second section of the same mold as the torch head 202 and handle 204), and applying the overmold simultaneously to both ends of the welding torch 100.

Figure 9:
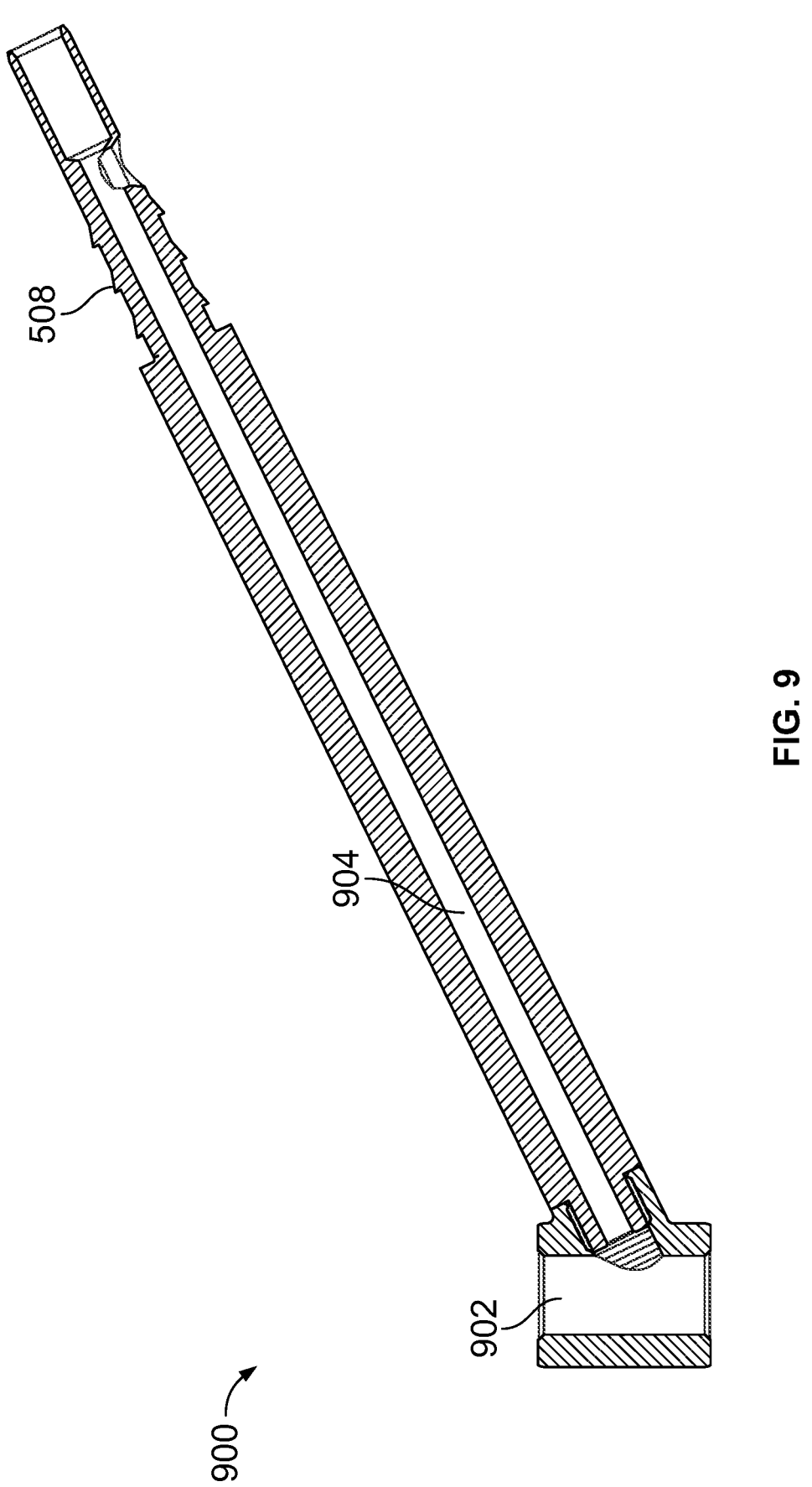
FIG. 9 is a perspective view of another example component in which the torch head and handle are integrated into a single piece.

FIG. 9 is a perspective view of another example torch head 900 in which the torch head and handle are integrated into a single piece. In contrast with the example torch head 202 and handle 204 of FIGS. 2-6, the example torch head 900 of FIG. 9 includes a single piece that both holds the collet and tungsten electrode and is mechanically, electrically, and fluidly coupled to the welding cable 108.

The example torch head 900 of FIG. 9 includes a first bore 902 and a second bore 904, as well as the retention features (e.g., barbs 508) for connection to the welding cable 108. The torch head 900 may be connected to the welding cable 108 in the same manner as described above with respect to the handle 204 of FIGS. 5 and 6.

Figure 10:
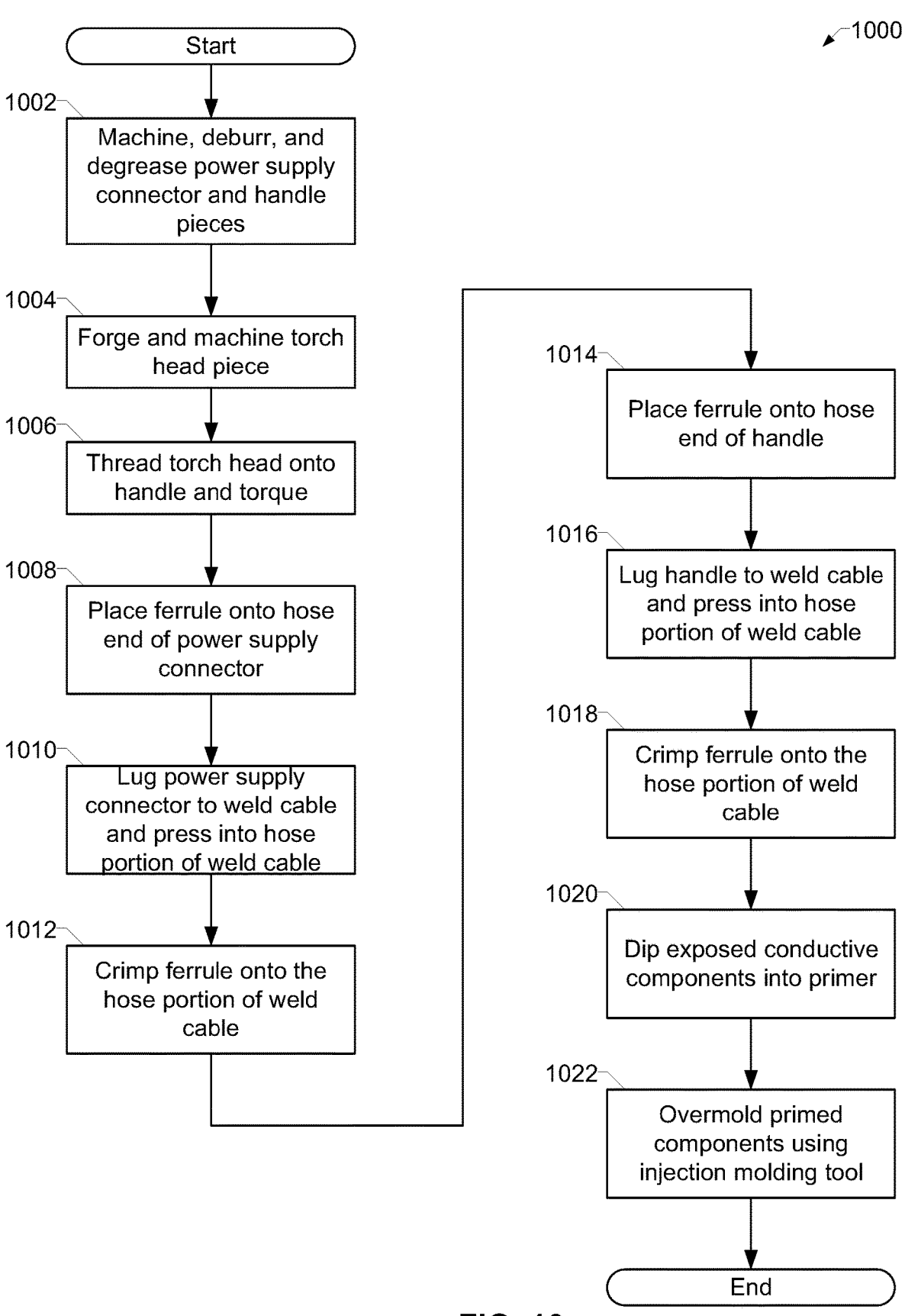
FIG. 10 is a flowchart representative of an example method to construct the example integrated GTAW torch of FIG. 1.

FIG. 10 is a flowchart representative of an example method 1000 to construct the example integrated GTAW torch 100 of FIG. 1. While the method 1000 illustrates an example order of blocks or steps, the order of some of the blocks may be modified, or blocks may be divided or combined as appropriate. The example method 1000 is described below with reference to the example cable and components of FIGS. 1-8, but may be modified as appropriate for other welding torch implementations.

Block 1002 involves machining, deburring, and degreasing the power supply connector 206 and handle 204 pieces.

Block 1004 involves forging and machining the torch head piece 202. For example, the torch head piece 202 may be forged and then machined to create the bores 302, 304.

Block 1006 involves threading the torch head 202 onto the handle 204 and torqueing the torch head 202 and handle 204 to achieve the desired torque. In some examples, torqueing may involve inducing deformation of the threads of the torch head 202 and handle 204.

On the power supply connector end of the welding cable 108, block 1008 involves placing a hose ferrule onto the hose end of the power supply connector 206. Block 1010 involves lugging the power supply connector 206 to the welding cable 108 (e.g., to a conductor portion of the welding cable 108), and pressing the power supply connector 206 into the hose portion of the welding cable 108. Block 1012 involves crimping the hose ferrule onto the hose portion of the welding cable 108 to secure the welding cable 108 to the power supply connector 206.

On the handle end of the welding cable 108, block 1014 involves placing a hose ferrule onto the hose end of the handle 204. Block 1016 involves lugging the handle 204 to the welding cable 108 (e.g., to a conductor portion of the welding cable 108), and pressing the handle 204 into the hose portion of the welding cable 108. Block 1018 involves crimping the ferrule onto the hose portion of the welding cable 108 to secure the welding cable 108 to the handle 204.

Block 1020 involves dipping surfaces to be overmolded (e.g., the torch head 202, the handle 204, the power supply connector 206, portions of the cable 108) into a primer in preparation for molding (e.g., to improve the bond between the overmold material and the base substrate). In some examples, dipping in primer may be replaced and/or supplemented by other surface treatment techniques, such as plasma discharge surface treatment. Block 1022 involves overmolding the primed components using an injection molding tool. In the example of FIG. 10, the overmolding may further involve molding over portions of the welding cable 108 that are adjacent the primed components to provide sealing and/or strain relief. The example method 1000 then ends.

Figure 11:
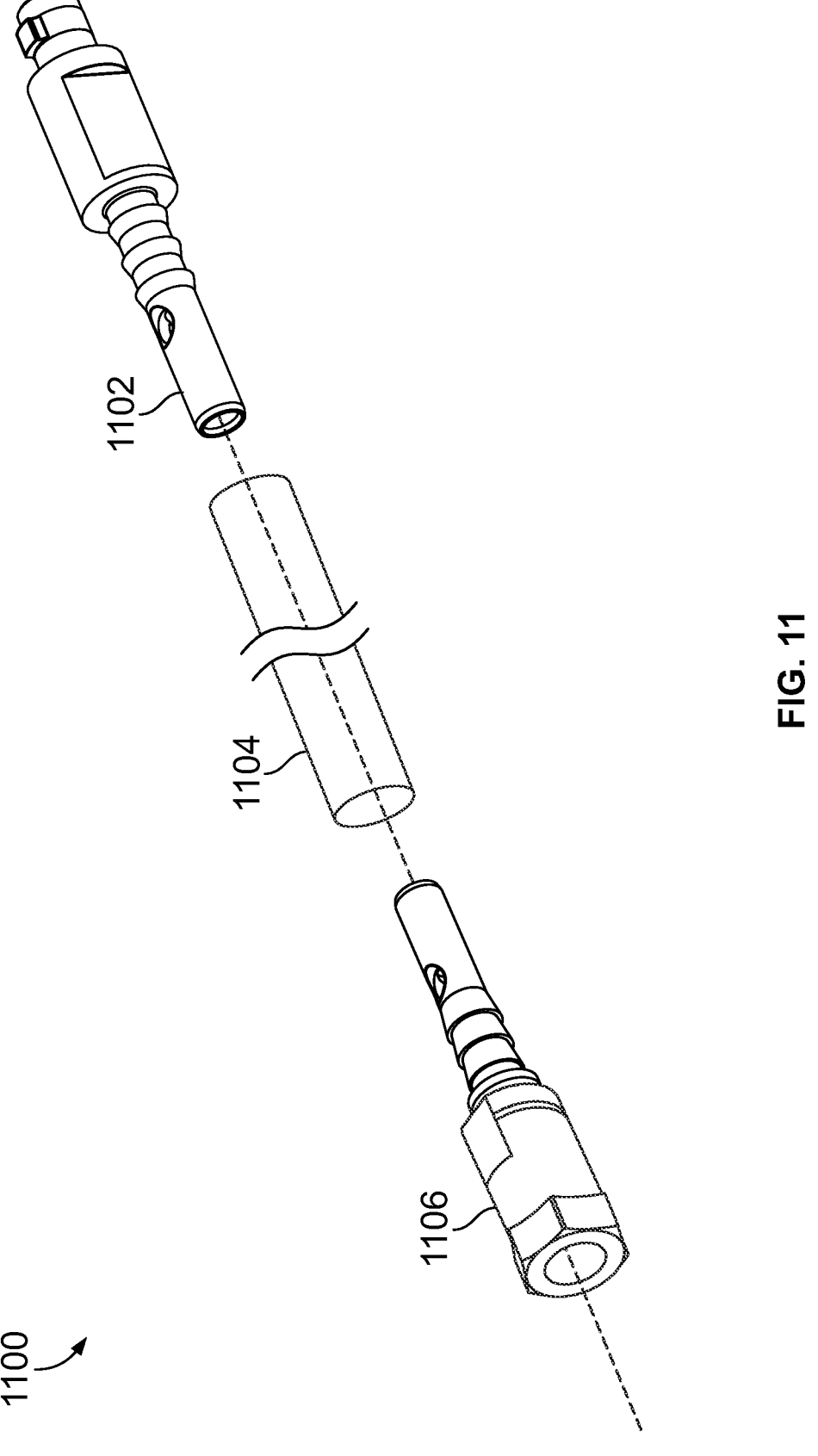
FIG. 11 is a perspective view of example integrated components of an extension cable that may be used to extend a length of a welding torch cable, in accordance with aspects of this disclosure.

FIG. 11 is a perspective view of example integrated components of an extension cable 1100 that may be used to extend a length of a welding torch cable. For example, one or more extension cables 1100 may be connected between the power supply connector 106 of the torch 100 and the welding power supply.

The example extension cable 1100 of FIG. 11 includes a male power supply connector 1102, which may be similar or identical to the power supply connector 206 of FIGS. 2, 5, and 6, and a welding cable 1104, which may be similar or identical to the welding cable 108 of FIG. 1. The example welding cable 1104 may be any desired length to allow the welding power supply to be placed a farther distance from the location of welding than would be possible with the welding cable 108 that is connected to or part of the torch 100. The extension cable 1100 delivers electrical current and shielding gas from the welding power supply to the connected welding torch.

The extension cable 1100 further includes a female power supply connector 1106. The female power supply connector 1106 is configured to be mechanically, electrically, and fluidly connected to a welding power supply. In some examples, the female power supply connector 1106 is configured to receive connectors of the same type as the male power supply connector 1102. In some other examples, the male power supply connector 1102 and the female power supply connector 1106 are of different types such that the extension cable 1100 further acts as a welding gun adapter.

Like the male power supply connector 1102, the example female power supply connector 1106 includes a hose end configured to be electrically, mechanically, and fluidly coupled to the welding cable 1104. To this end, the female power supply connector 1106 includes retention features such as barbs 1108. While the retention features of the illustrated example are barbs, other retention features may be used, such as knurling, hose clamps, stippling, flaring, and/or any other retention feature.

The welding cable 1104 is attached to the hose end of the example female power supply connector 1106 by fitting a ferrule over the hose, lugging the female power supply connector 1106 to a conductor cable portion of the welding cable 1104, pressing the female power supply connector 1106 into the hose of the welding cable 1104, and crimping a ferrule onto the hose to retain the female power supply connector 1106 onto the hose via the retention features (e.g., the barbs 1108 of FIG. 11). Once attached, the shielding gas may flow into the handle 204 from the welding cable.

The example female power supply connector 1106 and the male power supply connector 1102 are constructed of a brass, copper, or other conductor. Following attachment of the female power supply connector 1106 and the male power supply connector 1102 to the welding cable 1104, the female power supply connector 1106 and the male power supply connector 1102 may be overmolded or otherwise covered (e.g., a clamshell cover).

Figure 12:
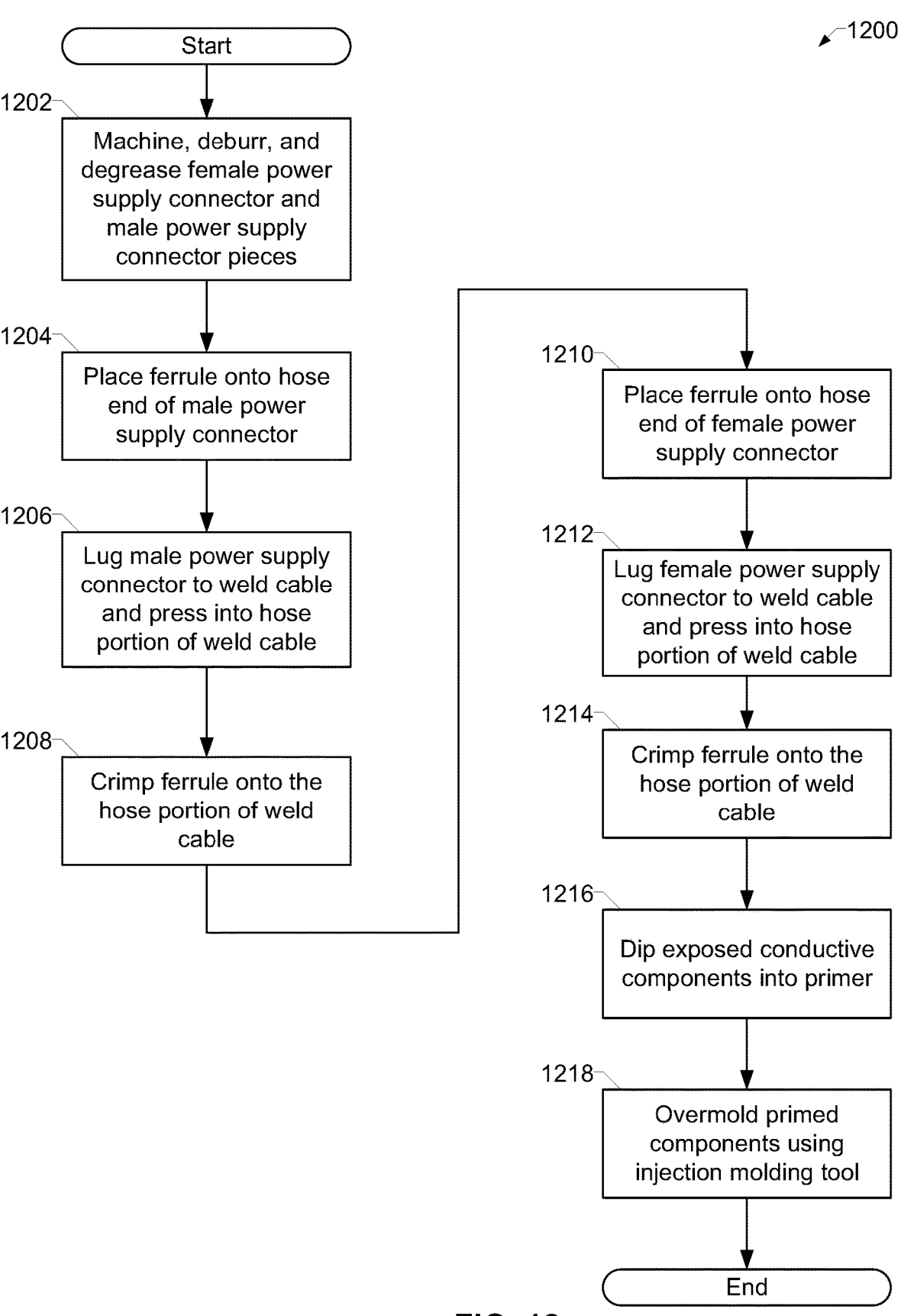
FIG. 12 is a flowchart representative of an example method to construct the example integrated torch extension cable of FIG. 11.

FIG. 12 is a flowchart representative of an example method 1200 to construct the example integrated torch extension cable 1100 of FIG. 11. While the method 1200 illustrates an example order of blocks or steps, the order of some of the blocks may be modified, or blocks may be divided or combined as appropriate. The example method 1200 is described below with reference to the example cable and components of FIG. 11, but may be modified as appropriate for other welding torch implementations.

Block 1202 involves machining, deburring, and degreasing the male power supply connector 1102 and female power supply connector 1106 pieces.

On the male power supply connector 1102 end of the welding cable 1104, block 1204 involves placing a hose ferrule onto the hose end of the male power supply connector 1102. Block 1206 involves lugging the male power supply connector 1102 to the welding cable 1104 (e.g., to a conductor portion of the welding cable 1104), and pressing the male power supply connector 1102 into the hose portion of the welding cable 1104. Block 1208 involves crimping the hose ferrule onto the hose portion of the welding cable 1104 to secure the welding cable 1104 to the male power supply connector 1102.

On the female power supply connector 1106 end of the welding cable 1104, block 1210 involves placing a hose ferrule onto the hose end of the female power supply connector 1106. Block 1212 involves lugging the female power supply connector 1106 to the welding cable 1104 (e.g., to a conductor portion of the welding cable 1104), and pressing the female power supply connector 1106 into the hose portion of the welding cable 1104. Block 1214 involves crimping the hose ferrule onto the hose portion of the welding cable 1104 to secure the welding cable 1104 to the female power supply connector 1106.

Block 1216 involves dipping the exposed conductive components (e.g., the male power supply connector 1102 and the female power supply connector 1106) into a primer in preparation for molding. Block 1218 involves overmolding the primed components using an injection molding tool. In the example of FIG. 12, the overmolding may further involve molding over portions of the welding cable 1104 that are adjacent the primed components to provide sealing and/or strain relief. The example method 1200 then ends.

The example manufacturing methods 1000 and 1200 of FIGS. 10 and 12 are devoid of brazing and bright dipping operations, which reduces manufacturing costs and complexity.

Returning to FIG. 1, in some examples the welding torch 100 may be provided with one or more input devices, such as buttons, wheels, triggers, and/or other types of inputs. For example, input devices may initiate the flow of welding current and/or shielding gas to the torch 100, and/or allow adjustment welding parameters at the welding torch. One or more input devices may be attached to the handle 104, either under or over the molding or other cover. For example, an input device such as a button may be attached over the cover of the handle 104, and input circuitry coupled to the input device (e.g., for translating inputs into signals or commands) may be attached over the cover or molding of the handle 104, or attached or retained under the cover or molding of the handle 104. However, any other arrangement of input devices may be implemented on the torch 100.

Figure 13:
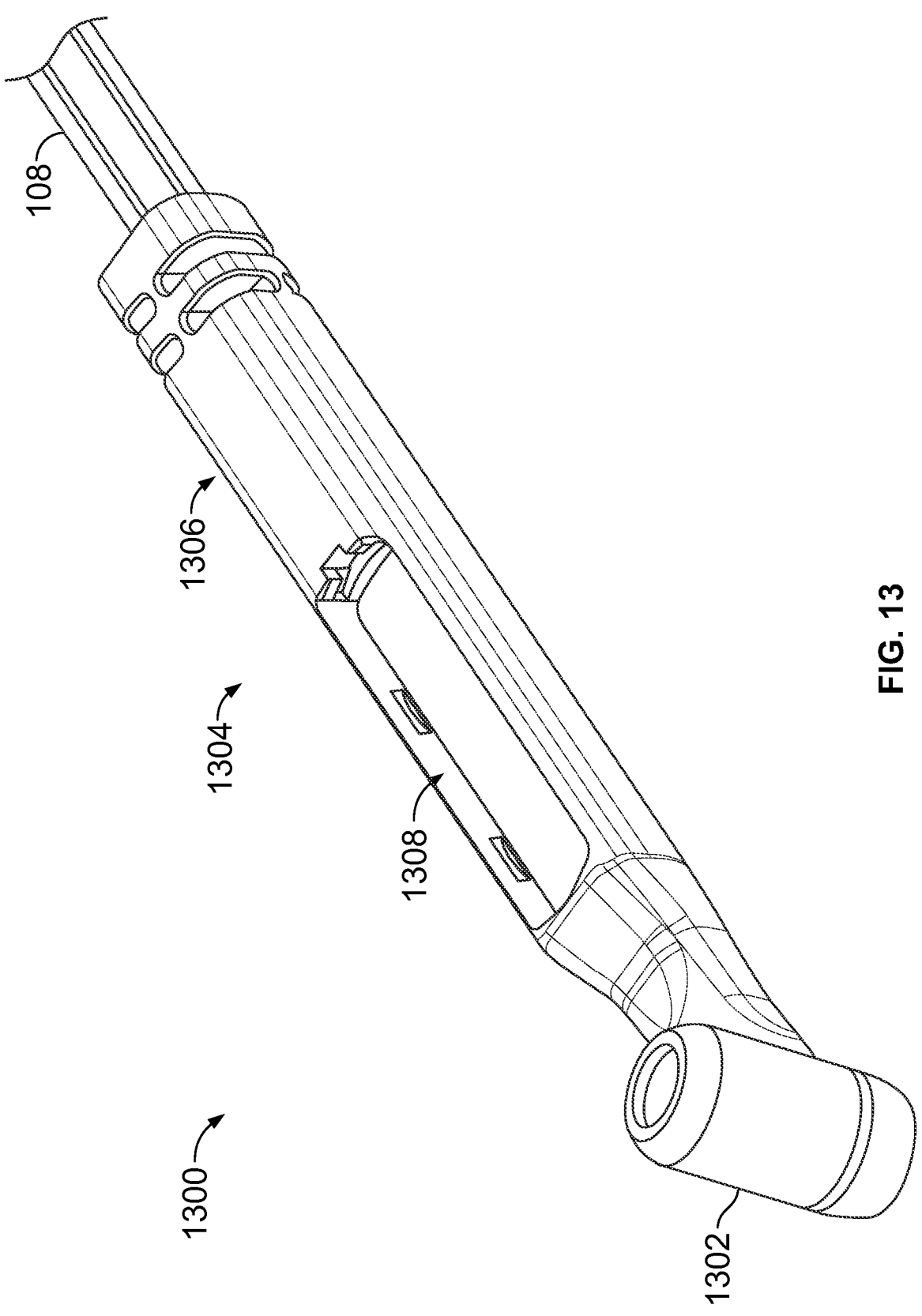
FIG. 13 illustrates another example welding torch including a slot in an overmold, in which an input device can be inserted and held, in accordance with aspects of this disclosure.

FIG. 13 illustrates another example welding torch 1300 including a slot in an overmold, in which an input device can be inserted and held. The example welding torch 1300 includes a torch head 1302, a handle 1304, overmolding 1306, and the welding cable 108. The example welding torch 1300 may further include the torch head piece 202 and the handle piece 204 illustrated in FIG. 2. A pocket 1308 may be formed as part of the overmolding process (e.g., block 1022 of FIG. 10), and is accessible from the exterior of the torch 1300.

Figure 14:
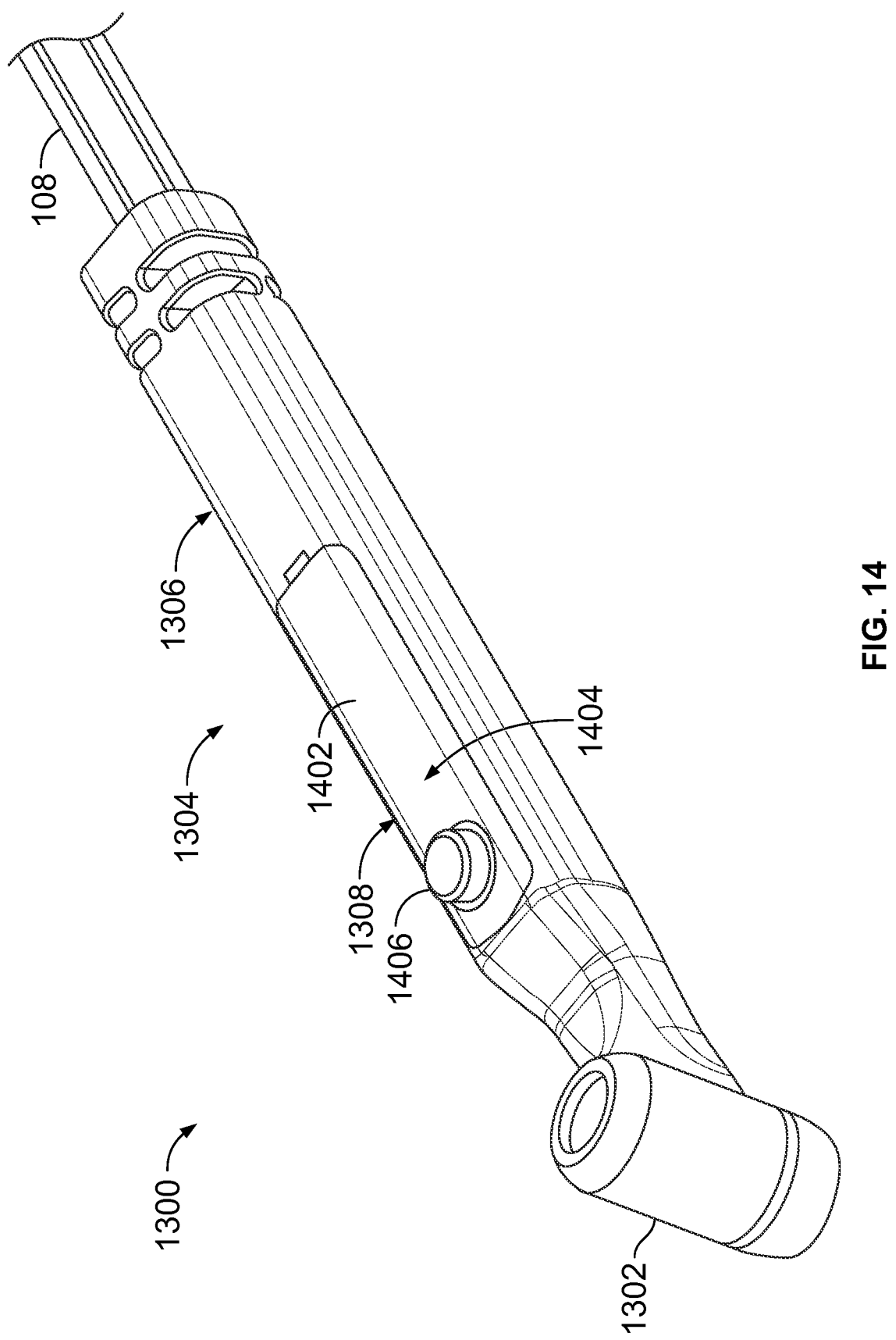
FIG. 14 illustrates the example welding torch of FIG. 13 including a control device installed in the slot.

FIG. 14 illustrates the example welding torch 1300 including a control device 1402 installed in the pocket 1308. The example control device 1402 includes a housing 1404 configured to fit within the pocket 1308. The pocket 1308 and/or the housing 1404 may include retention features such as clips, tabs, and/or slots for insertion of tabs of the input device, and/or any other features (e.g., biasing elements such as springs) to assist in retaining the installed control device 1402 on the torch 1300.

While an example shape of the pocket 1308 and the control device 1402 are illustrated in FIGS. 13 and 14, any other shape may be used.

The control device 1402 further includes one or more input devices 1406, which may be manipulated by, for example, the user's finger to control one or more weld parameters during a welding operation. The example input device 1406 of FIG. 14 may be a dial, a button, and/or any other type of input device. The control device 1402 communicates wirelessly with a power supply, and includes the associated processing and communications circuitry, as well as a power supply (e.g., battery).

While the examples disclosed above are discussed with reference to a GTAW torch, other examples may involve gas metal arc welding (GMAW) torches, flux cored arc welding (FCAW) torches, shielded metal arc welding (SMAW) torches, plasma cutting torches, and/or any other type of welding torch. For example, a GMAW torch may be provided with a single-piece handle connected to a neck and nozzle assembly, in which at least the handle and a portion of the connected welding cable are overmolded as disclosed above. A control device, similar or identical to the control device 1402, may be adapted for use as the trigger of the GMAW torch. In some examples, the cover on a GMAW torch may include a pocket in one or more locations to allow for adaptability of the location of the control device or trigger. Example GMAW torches may include a same or similar welding cable 108 and power supply connector 206 as disclosed above, which may also be overmolded as disclosed above.

As another example, a SMAW torch (or stinger) may have a single-piece handle connected to jaws which are configured to grip an SMAW electrode. At least the handle and a connected weld cable are overmolded or otherwise covered to provide improved ingress protection. However, additional portions of the SMAW torch, such as an exterior-facing portion of the jaws, may also be overmolded. Example SMAW torches may include a same or similar welding cable 108 and power supply connector 206 as disclosed above, which may also be overmolded as disclosed above.

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y, and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding torch, comprising:
   a handle piece that is electrically and mechanically connected to the torch head on a first end of the handle piece;
   a power supply connector configured to be coupled to a welding power supply on a first end of the power supply connector, wherein at least one of the handle piece or the power supply connector are a single piece;
   a welding cable that is electrically and directly mechanically connected to both a second end of the handle piece and a second end of the power supply connector;
   a first cover over the handle piece and a first portion of the welding cable connected to the handle piece; and
   a second cover over the power supply connector and a second portion of the welding cable connected to the power supply connector.

2. The welding torch as defined in claim 1, wherein the torch head, the handle piece, and the power supply connector are each a single piece.

3. The welding torch as defined in claim 1, wherein the torch head and the handle piece are combined as a single piece.

4. The welding torch as defined in claim 1, wherein at least one of the first cover or the second cover comprises an overmolding.

5. The welding torch as defined in claim 1, wherein at least one of the first cover or the second cover comprises a clamshell cover.

6. The welding torch as defined in claim 1, further comprising a torch head configured to support an electrode.

7. The welding torch as defined in claim 6, wherein the first cover is further over the torch head.

8. The welding torch as defined in claim 6, further comprising:
   a back cap attached to the torch head;
   a nozzle attached to the torch head; and
   a collet attached to the torch head and configured to hold a tungsten electrode in electrical continuity with the torch head.

9. The welding torch as defined in claim 6, wherein the handle piece has exterior threads on the first end of the handle piece and the torch head comprises interior threads configured to receive the exterior threads.

10. The welding torch as defined in claim 9, wherein the interior threads of the torch head and the exterior threads of the handle piece comprise interfering threads.

11. The welding torch as defined in claim 1, wherein the gas tungsten arc welding torch does not include brazing.

12. The welding torch as defined in claim 1, further comprising an input device attached to the handle piece.

13. The welding torch as defined in claim 12, further comprising input circuitry coupled to the input device and attached to the handle piece, wherein the input circuitry is positioned on an exterior of the handle piece and under the first cover.

14. The welding torch as defined in claim 1, further comprising a control device configured to be detachably coupled to the first cover.

15. The welding torch as defined in claim 14, wherein the control device is a wireless control device configured to communicate an input to a welding power supply via wireless communications.

16. The welding torch as defined in claim 14, wherein the control device comprises a housing configured to fit within a pocket in the first cover.

17. The welding torch as defined in claim 16, wherein at least one of the pocket or the housing comprises a retention feature to retain the housing within the pocket.

18. The welding torch as defined in claim 16, wherein the pocket is formed as part of an overmolding process.

19. The welding torch as defined in claim 1, wherein the welding cable is configured to be crimped to the second end of the handle piece such that a conductor of the welding cable is secured in electrical contact with the handle piece.

20. The welding torch as defined in claim 1, wherein the welding cable is configured to be crimped to the second end of the power supply connector such that a conductor of the welding cable is secured in electrical contact with the power supply connector.

21. The welding torch as defined in claim 1, wherein the second cover comprises a molded strain relief configured to absorb stress between a jacket of the welding cable and the power supply connector.

22. A welding torch extension cable, comprising:
   a female power supply connector configured to receive a welding cable connector on a first end of the female power supply connector;
   a male power supply connector configured to be coupled to a welding power supply on a first end of the male power supply connector;
   a welding cable that is electrically and mechanically connected to both a second end of the female power supply connector and a second end of the male power supply connector;
   a first cover over the female power supply connector and a first portion of the welding cable connected to the female power supply connector, wherein the first and second ends of the female power supply connector are a single piece; and
   a second cover over the male power supply connector and a second portion of the welding cable connected to the male power supply connector, wherein the first and second ends of the male power supply connector are a single piece.

* * * * *